US009333651B2

(12) United States Patent  (10) Patent No.: US 9,333,651 B2
Maisonnier et al.  (45) Date of Patent: May 10, 2016

(54) SYSTEM AND METHOD FOR EDITING AND CONTROLLING THE BEHAVIOR OF A MOBILE ROBOT

(75) Inventors: Bruno Maisonnier, Paris (FR); Jérôme Monceaux, Paris (FR)

(73) Assignee: ALDEBARAN ROBOTICS S.A, Paris (FR)

( * ) Notice: Subject to any disclaimer, the term of this patent is extended or adjusted under 35 U.S.C. 154(b) by 33 days.

(21) Appl. No.: 13/322,161

(22) PCT Filed: May 25, 2010

(86) PCT No.: PCT/EP2010/057111
§ 371 (c)(1),
(2), (4) Date: Jan. 10, 2012

(87) PCT Pub. No.: WO2010/136427
PCT Pub. Date: Dec. 2, 2010

(65) Prior Publication Data
US 2012/0136481 A1  May 31, 2012

(30) Foreign Application Priority Data

May 26, 2009  (FR) ...................................... 09 53434

(51) Int. Cl.
*G05B 19/04* (2006.01)
*B25J 9/16* (2006.01)
*G06N 3/00* (2006.01)

(52) U.S. Cl.
CPC .............. *B25J 9/1661* (2013.01); *B25J 9/1671* (2013.01); *G06N 3/008* (2013.01); *G05B 2219/40392* (2013.01)

(58) Field of Classification Search
CPC ............ G05B 2219/40099; G05B 2219/40392
See application file for complete search history.

(56) References Cited

U.S. PATENT DOCUMENTS 5,369,346 A * 11/1994 Takahashi et al. ........ 318/568.17
5,841,959 A * 11/1998 Guiremand .................... 345/440
(Continued)

FOREIGN PATENT DOCUMENTS

| FR | 2918477 A1 | 1/2009 |
| JP | 2002-120174 A | 4/2002 |
| JP | 2003-266347 A | 9/2003 |

OTHER PUBLICATIONS

Andrew Begel, LogoBlocks: A Graphical Programming Language for Interacting with the World, May 1996, MIT Media Library.*

(Continued)

*Primary Examiner* — Khoi Tran
*Assistant Examiner* — Ryan Rink
(74) *Attorney, Agent, or Firm* — Baker and Hostetler LLP

(57) ABSTRACT

A system and a method for editing and controlling actions of a mobile robot allowing for the creation and modification of behaviors and of motions both according to an event logic and according to a time logic, the latter controlling the event logic and thus allowing for the synchronization of the behaviors and motions of different robot subassemblies. The system is organized in behavior and motion layers including action sequences and a timeline. The actions can be programmed in boxes interconnected by signals which convey information. The boxes are organized in a hierarchical structure, the lowest level of which comprises a script that can be interpreted by a virtual robot which simulates the execution of the commands and, where appropriate, by a physical robot. The motions of the robot can also be controlled graphically by motion screens.

19 Claims, 15 Drawing Sheets

(56) References Cited

U.S. PATENT DOCUMENTS

| | | |
|---|---|---|
| 6,470,235 B2 | 10/2002 | Kasuga et al. |
| 6,718,231 B2 | 4/2004 | Konno et al. |
| 8,458,667 B2 * | 6/2013 | Hartadinata .................. 717/125 |
| 2002/0178281 A1 * | 11/2002 | Aizenbud-Reshef et al. 709/232 |
| 2003/0023347 A1 * | 1/2003 | Konno et al. ................. 700/245 |
| 2007/0150102 A1 | 6/2007 | Park et al. |
| 2010/0311300 A1 * | 12/2010 | Hansen et al. .................. 446/91 |

OTHER PUBLICATIONS

Georgios Pierris et al.: "An interactive tool for designing complex robot motion patterns," Robotics and Automation, 2009. ICRA '09. IEEE International Conference on, ISSS, Piscataway, NJ, USA. May 12, 2009, pp. 4013-4018.

\* cited by examiner

SYSTEM AND METHOD FOR EDITING AND CONTROLLING THE BEHAVIOR OF A MOBILE ROBOT

CROSS-REFERENCE TO RELATED APPLICATIONS

This application is a National Stage of International patent application PCT/EP2010/057111, filed on May 25, 2010, which claims priority to foreign French patent application No. FR 09 53434, filed on May 26, 2009, the disclosures of each of which are incorporated by reference in their entireties.

FIELD OF THE DISCLOSED SUBJECT MATTER

The present invention relates to the field of robot programming systems. More specifically, it applies to the editing and controlling of behaviors and motions of robots which move around on articulated limbs or use them, notably robots of human or animal form.

BACKGROUND

A robot can be qualified as humanoid from the moment when it has certain human appearance attributes: a head, a trunk, two arms, two hands, two legs, two feet, etc. A humanoid robot may, however, be more or less sophisticated. Its limbs may have a greater or lesser number of articulations. It may control its own balance statically and dynamically and walk on two limbs, possibly in three dimensions. It may pick up signals from the environment ("hear", "see", "touch", "sense", etc.) and react according to more or less sophisticated behaviors, and interact with other robots or humans, either by speech or by gesture. To best exploit these capabilities, there remains a need to provide the computer control unit of the robot with the commands for said behaviors. Some robots can independently fetch the commands needed to execute behaviors corresponding to their usage profile. However, there remains a need for a user to be able to intervene to create new behaviors and motions.

A first way of programming the necessary commands is to have them run according to a predetermined time sequence. This programming logic offers the advantage that the behavior of the robot is predictable in time: the series of behaviors has a start point and an end point which occur at predictable times. See, for example, the method for editing and time programming the behaviors of a robot disclosed by U.S. Pat. No. 6,718,231. However, this logic encounters its limit in the fact that the interactions of the robot with its environment are both inevitable (encountering obstacles on the path) and desirable (reactions of the robot to the demands of the environment or of its user), these events interrupting the progress of the sequence of preprogrammed behaviors.

This is why another programming logic, of event type, based on state machine theory, has been used for humanoid robots as well as for the industrial robots: in this programming logic, links connect behaviors, the second event in a chain being dependent on the outputs of the first event. This logic makes it possible to control the interactions with the environment. See, for example, the method for editing and event programming a robot disclosed by U.S. Pat. No. 6,470,235. This logic does, however, present the drawback of interrupting a preprogrammed sequence of behaviors until the expected event has occurred. A simplified example will make it easy to understand this difficulty: a user wants the robot to go from a first position to a second position that it must reach at a determined instant. In its path, it may have to perform actions which depend on interactions with the environment (say "hello" to another robot that it encounters, collect an object, etc.). A purely event programming, not constrained by time, cannot resolve this problem.

A method which juxtaposes the two event and time programming logics is disclosed by Japanese Patent Application Pub. No. JP 2002/120174. In said method, however, the programmer must intervene in one of the two program blocks to make them compatible. This method does not therefore resolve the problem consisting in making the two event and time programming logics compatible without the intervention of the programmer.

SUMMARY

The present invention solves this problem by providing a system and a method for editing and programming behaviors of a robot which combines both time and event programming logics without the intervention of the programmer on each event.

To this end, the present invention discloses a method enabling a user to edit and control at least one action of a mobile robot belonging to a group of actions of a behavior type and of a motion type, and belonging to at least one main action frame, wherein said main action frame is connected to at least one event chosen from a group of preceding events and of succeeding events and is proceeding according to a time constraint defined by a timeline.

Advantageously, said main action frame belongs to at least one action layer.

Advantageously, said action layer belongs to a control box.

Advantageously, said main action frame is of a behavior type and is broken down into elementary behaviors, each defined by at least one control box, said control boxes being interconnected within at least one flow diagram.

Advantageously, at least two behavior main frames proceed according to the same timeline and each comprise at least one control box of the first behavior main frame connected to at least one control box of the second behavior main frame.

Advantageously, at least one control box comprises at least one second control box.

Advantageously, said second control box enables the user to set an operating parameter of the higher level control box.

Advantageously, the control box comprises a script that can be directly interpreted by the robot, said program being directly modifiable by the user.

Advantageously, said control box comprises at least one input and at least one output.

Advantageously, at least one output of at least one first control box is linked to at least one input of at least one second control box by a connector conveying a signal representative of an event.

Advantageously, the mobile robot comprises a head and up to four limbs.

Advantageously, the action is a motion of at least a part of the robot chosen from the group comprising at least the head and up to four limbs and defined by a rotation of at least one motor.

Advantageously, the at least one rotation of the at least one motor is defined by an action of the user on a cursor positioned on a motion screen representing the part of the robot to be set into motion.

The invention also discloses a computer program for implementing the method for editing and controlling actions of a mobile robot, and an editing and control system comprising said program and a robot capable of receiving instructions from the editing and control system.

The invention also provides the advantage of allowing for a user-friendly editing of the commands to be executed by the robot which allows for the use of both preprogrammed behavior and motion control boxes. The boxes are organized in a hierarchical structure which makes it possible to break down the complex behaviors into elementary behaviors. The elementary behaviors can be programmed in a script language that can be directly interpreted by the robot. The scripts are organized in modules which use common data structures and are thus independent of one another. The user can intervene at all the levels of the hierarchical behavior tree. The user can also create interactions between behaviors of a branch of the tree and other behaviors belonging to another branch of the tree. He or she can also intervene at the level of the elementary motions of the robot which will determine a given behavior. Furthermore, the system is compatible with a number of development environments (languages such as Python, URBI, notably; Windows XP, Mac OS, UNIX, etc.).

BRIEF DESCRIPTION OF THE DRAWINGS

The invention will be better understood and its various features and advantages will emerge from the following description of a number of exemplary embodiments and its appended figures in which.

DETAILED DESCRIPTION

Figure 1:
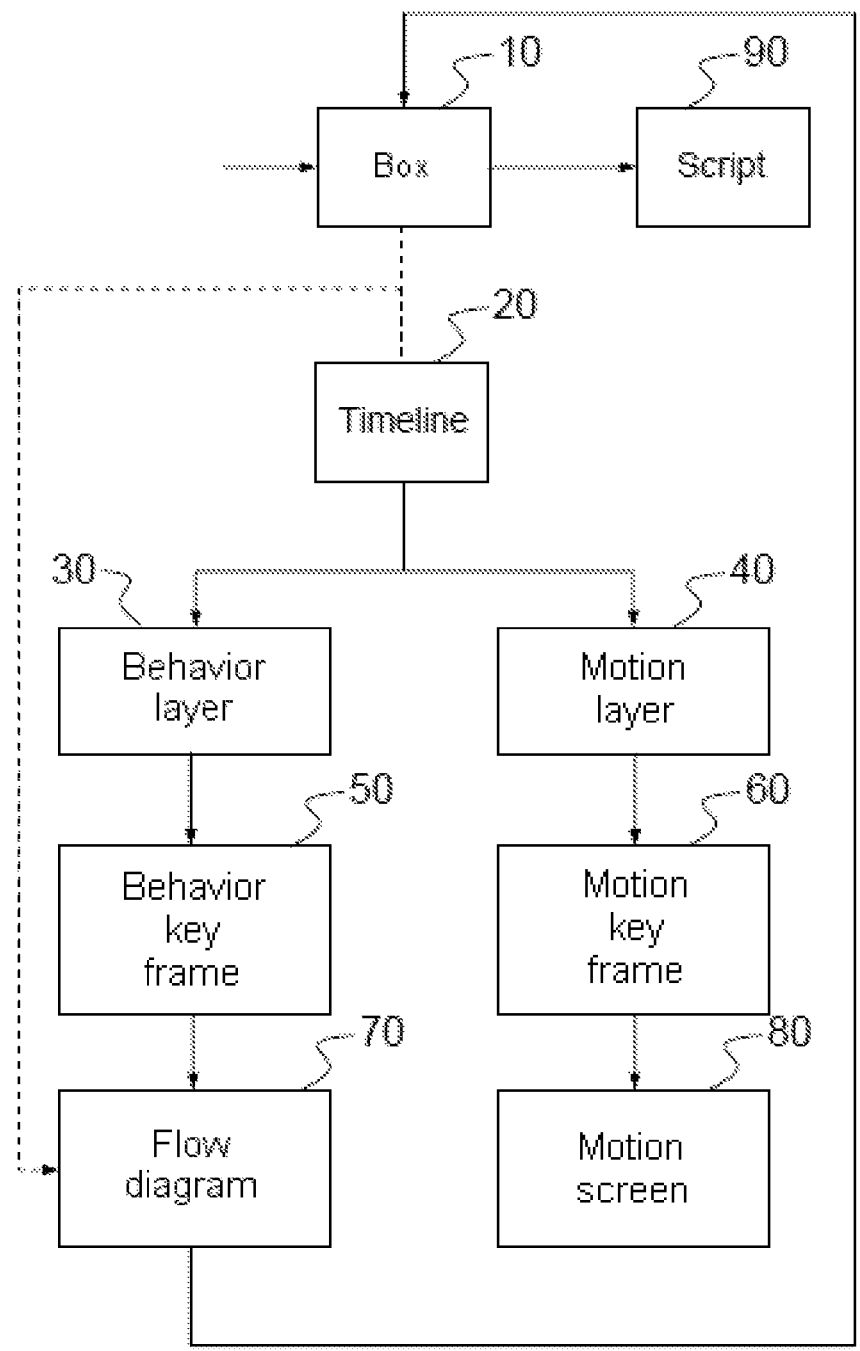
FIG. 1 is a diagram of the functional architecture for editing and programming behaviors of a robot in one embodiment of the invention.

FIG. 1 is a diagram of the functional architecture for editing and programming behaviors of a robot in one embodiment of the invention.

The robot controlled by the method and the system of the invention may be a humanoid robot with a head, a trunk and four limbs, each of the parts being articulated, each articulation being controlled by one or more motors. The invention enables a user of the system to control such a robot by creating behaviors that are simulated on a virtual robot and executed on the real robot connected to the system by a wired or wireless link.

It involves viewing, simulating and causing behaviors to be executed (such as walking—straight ahead, to the right or to the left by n steps; a "hello"—motions of one of the arms above the head; speech, etc.) and motions (of the head, of a part of a limb, of a given angle) on the screen of a computer programmed for this purpose.

The figure illustrates the articulation of the commands triggered by events with their time dimension. The commands triggered by events are represented in the semantic of the invention by boxes, or "control boxes" 10. A box is a tree-structured programming structure which may comprise one or more of the elements below which are then defined:
- a "timeline" or frame time axis 20;
- a "diagram" or flow diagram 70
- a script 90.

The control boxes are normally interconnected by connections which more often than not transmit an event information item from one box to the other, as detailed later in the description. Any box is directly or indirectly connected to a "root box" which initializes the behavior/motion scenario of the robot.

A frame time axis 20 represents the time constraint that the behaviors and the motions of the robot have to comply with, as defined in the box in which said frame time axis is inserted. Hereinafter in the description and the claims, the term timeline will be used which is commonly accepted to convey the same meaning in the programming world. The timeline thus produces the synchronization of the behaviors and motions of the box. It is subdivided into frames with which is associated a scrolling speed defined as a number of frames per second (FPS). The FPS of each timeline can be parametrized by the user. By default, the FPS can be set to a given value, for example 15 FPS.

A timeline may comprise:
- one or more behavior layers 30, each comprising one or more behavior main frames 50, which may in turn comprise one or more diagrams or "flow diagrams" 70, which are in fact sets of boxes which can also be directly attached to a higher level box, without passing through a behavior layer or a timeline;
- one or more motion layers 40, each comprising one or more motion main frames 60 which may comprise one or more motion screens 80.

A behavior layer defines a set of behaviors of the robot or behavior main frames. A number of behavior layers can be defined within one and the same box. They will then be programmed to run in a manner which is synchronized by the timeline of the box.

A behavior layer may comprise one or more behavior main frames. A behavior main frame defines a behavior of the robot, such as walking ("walk"), speaking ("say"), playing music ("music"), etc. A certain number of behaviors are preprogrammed in the system of the invention to be directly inserted by the user in a simple "drag and drop" operation from a library as detailed later in the description. Each behavior main frame is defined by a triggering event which is the start of the frame at which it is inserted into the timeline. The end of the behavior main frame is defined only inasmuch as another behavior main frame is inserted after it, or if an end event is defined.

A motion layer defines a set of motions of the robot which are programmed by one or more successive motion main frames which group together motions of the motors of the articulations of the robot. These motions to be executed are defined by the angular positions of arrival of said motors which can be programmed by action on motion screens, said actions being detailed later in the description. All the motion main frames of one and the same box are synchronized by the timeline of the box. A motion main frame is defined by an arrival frame. The departure frame is that of the end of the preceding motion main frame or that of the start event of the box.

The expression "action main frame" is used to mean both behavior main frames and motion main frames.

It is possible to execute a number of action main frames in parallel (behavior or motion), provided that they are attached to the same timeline.

A flow diagram is a set of interconnected boxes, as detailed below. Each of the boxes may in turn comprise other timelines to which are attached new behavior or motion layers.

A script is a program that can be directly executed by the robot. A box which comprises a script does not comprise any other element.

Figure 2:
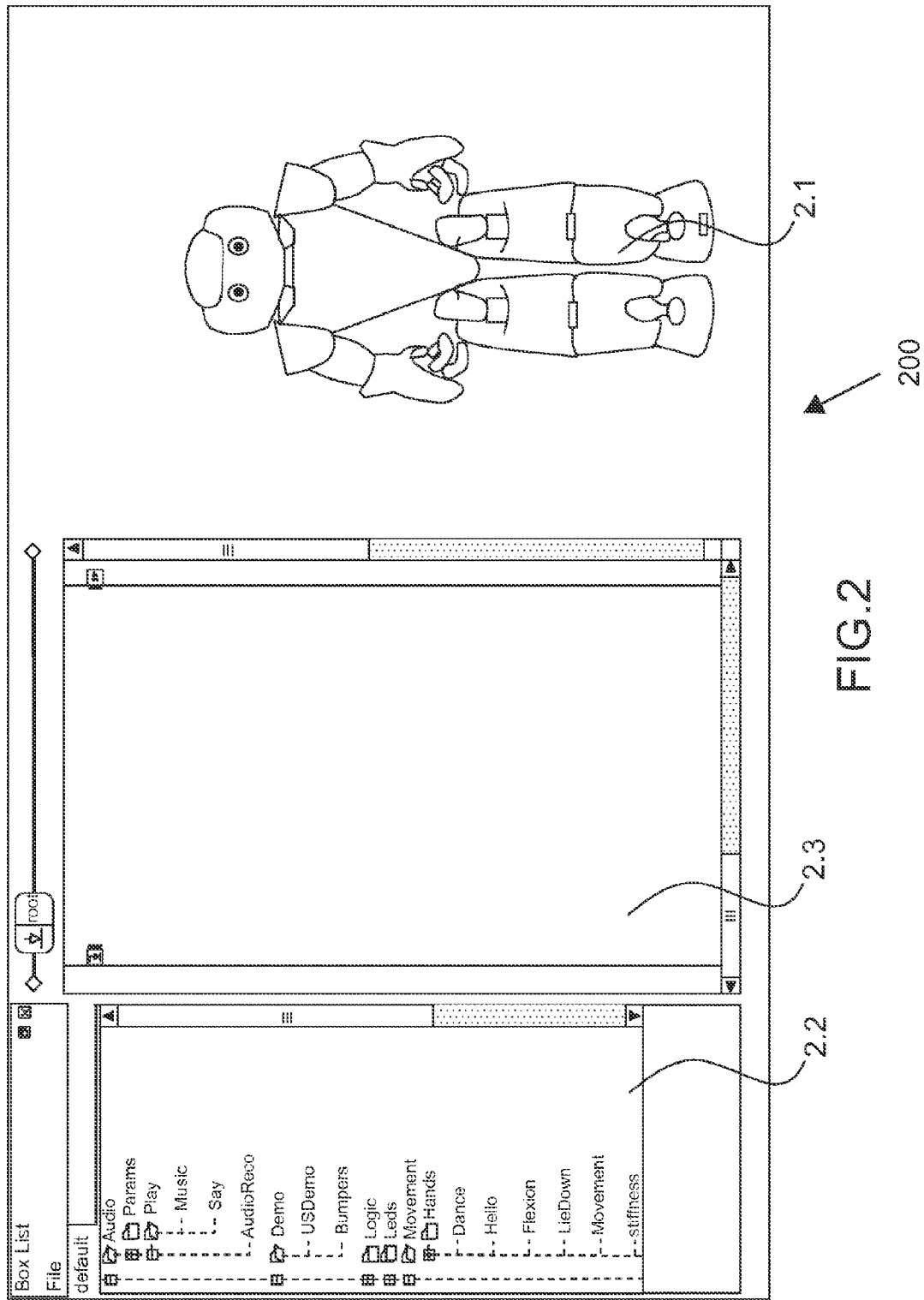
FIG. 2 is a view of the main screen of the system for editing and programming behaviors of a robot in one embodiment of the invention.

FIG. 2 is a view of the main screen 200 of the system for editing and programming behaviors of a robot in one embodiment of the invention.

The right-hand part 2.1 comprises a virtual image of the robot to be controlled which will make it possible to produce simulations of the execution of the commands. The robot may be of any type, but the invention will be particularly advantageous in the case of a humanoid or animal-shaped robot, having a head, a body and limbs.

The left-hand part 2.2 gives access to a library of behaviors which is stored on the computer. These behaviors are reusable components which can be used to define frequently used elementary behaviors such as walking, dancing, speaking, switching on of the eyes or other LEDs, etc.

The central part 2.3 is used to assemble the behaviors taken from the library 2.2 to edit them and assemble them in sequences of behaviors in flow diagram form, as indicated in detail later in the description.

Figure 3:
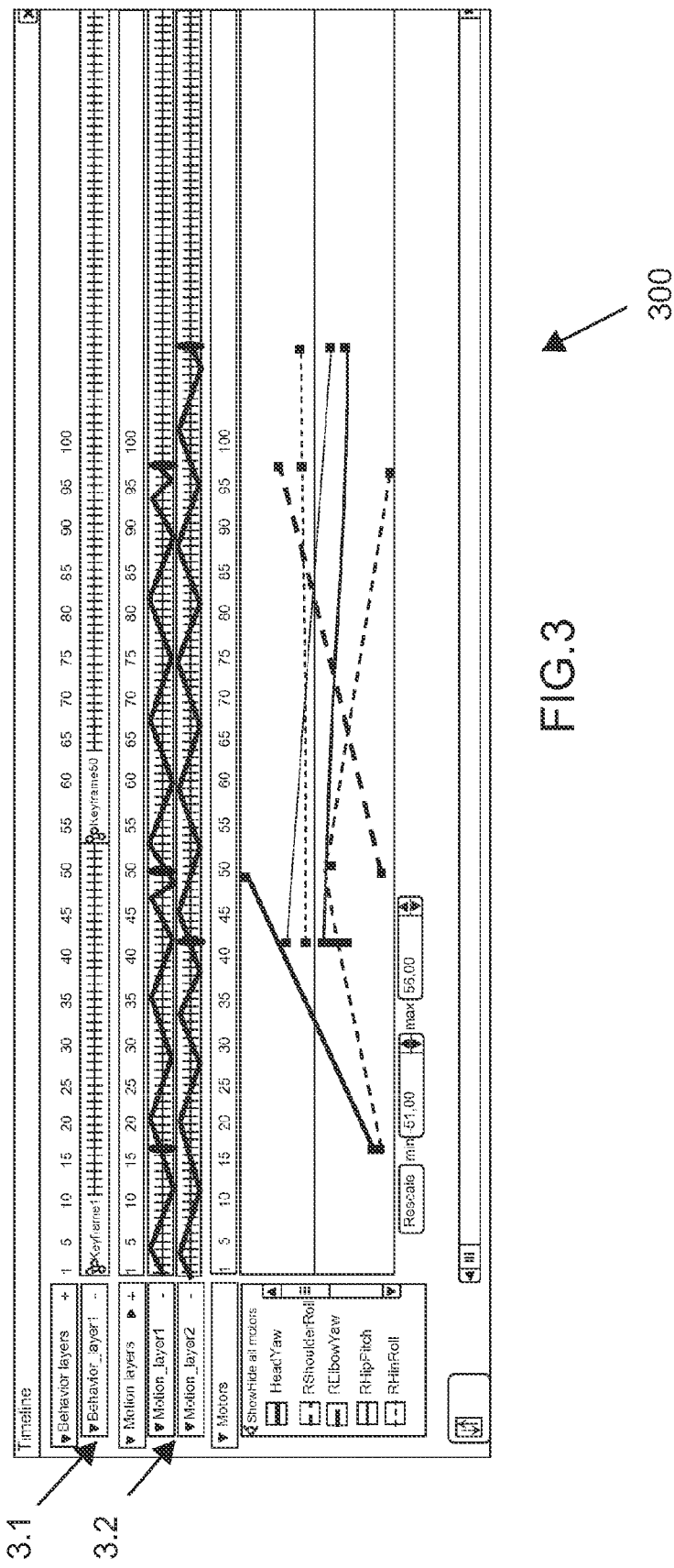
FIG. 3 is a view of the screen which enables a user to edit the behavior and motion layers of a robot in one embodiment of the invention.

FIG. 3 is a view of the screen 300 which enables a user to edit the behavior and motion layers of a robot in one embodiment of the invention.

As can be seen in the parts 3.1 (behavior layers) and 3.2. (motion layers), a number of layers can be defined in the behavior type and in the motion type and, in each layer, a number of main frames can be created.

The layers of a behavior type will be described hereinafter in the description.

The creation of the main frames of the layers of a motion type is explained later in the description. The modalities for editing motion main frames are explained here. It is possible to copy or move a sequence within a motion layer or from one motion layer to another. In this second case, it may be that the motion cannot be executed because of conflicting commands given to one and the same motor.

It is possible to smooth the transitions between motion sequences by producing an interpolation of linear or exponential type, for example. It is also possible to duplicate a sequence defined for an upper or lower limb in a sequence applicable to the symmetrical member in which the motions are themselves symmetrized.

As can be seen in part 3.3 of the figure, in a layer of a motion type, it is also possible to see the trend of the motors of each of the parts of the robot in a system of axes in which the X axis is the timeline of the behavior and motion layers and the Y axis is the angle of rotation of each of the motors which can be positive or negative. In an exemplary embodiment of the invention, the robot may include a number of motors. The motions can be modified by moving the stopping points of a motor on the X axis and/or on the Y axis. Some motor motions are not mutually compatible and cannot be executed.

Figure 4:
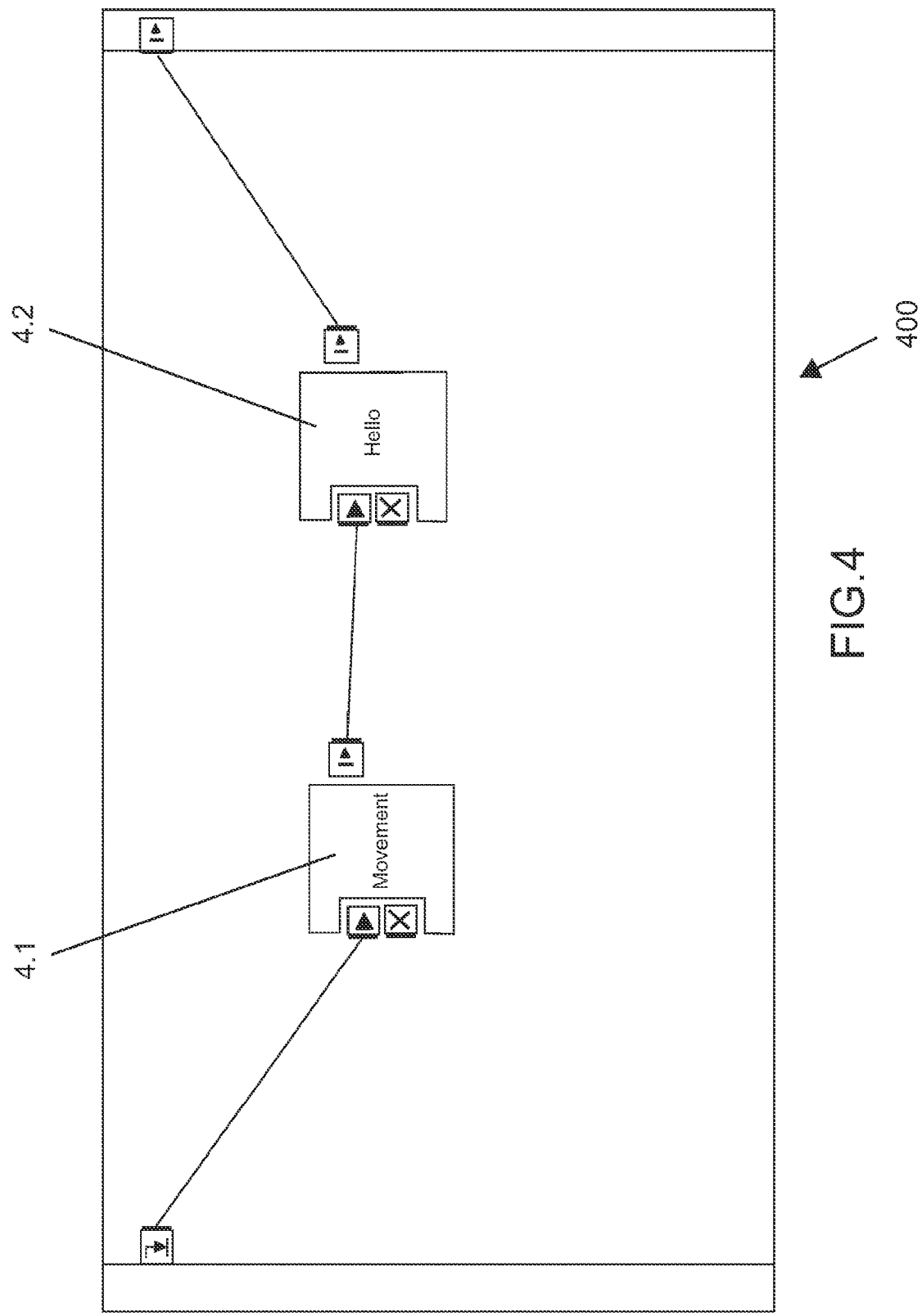
FIG. 4 is a view of a screen showing behavior control boxes connected for editing and programming a behavior main frame to be executed by a robot in one embodiment of the invention.

FIG. 4 is a view of a screen 400 showing behavior control boxes connected to edit and program a sequence of behaviors to be executed by a robot in one embodiment of the invention.

The behavior control box is the basic building block of a system for editing and controlling a robot according to the invention. A behavior control box defines one or more actions and has one or more inputs and one or more outputs. In the example of FIG. 4, the input is the "Start of behavior sequence X" event at the top left of the screen 2.3 of FIG. 2. This point is connected by an arc to one of the inputs situated on the left of the first "Movement" box 4.1. The output of said box is connected to one of the inputs of the second "Hello" box 4.2. The output of this second box is connected to the "End of behavior sequence X" event at the top right of the screen. The two boxes have been created in the screen by copying corresponding elements from the library 2.2 of FIG. 2 (drag and drop operation). The connections have been created graphically by linking the input/output points using the mouse.

As indicated in the commentary to FIG. 1, in one embodiment of the invention, the boxes can be of three types:
  script box, comprising a series of instructions in computer language; the languages used may be languages dedicated to robot control such as URBI™,
  flow diagram box, comprising a number of boxes, including for example a box enabling the user to define a parameter used by another box, such as, for example, the walking distance;
  box comprising a timeline with one or more motion layers and/or one or more behavior layers.

Figure 5:
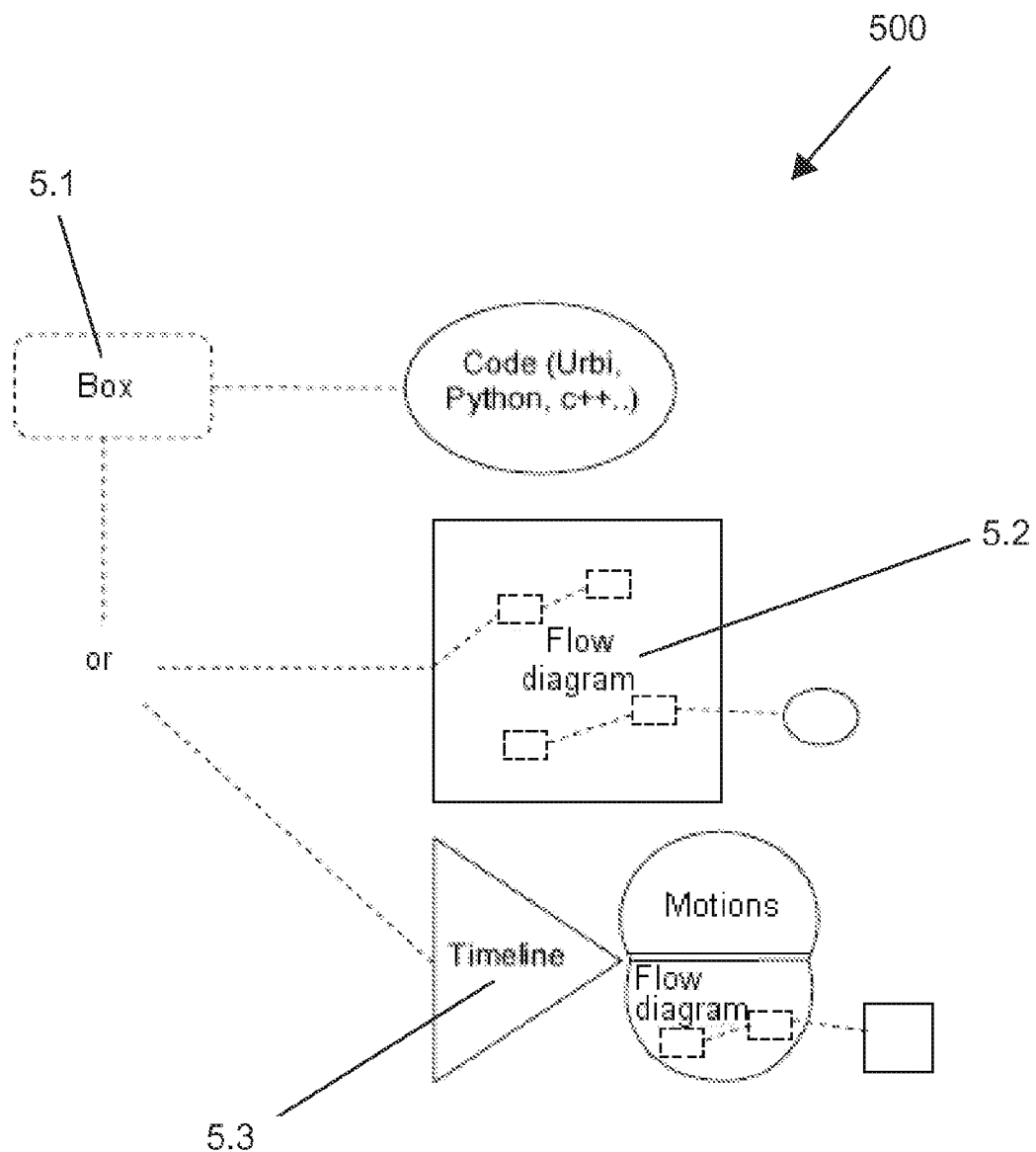
FIG. 5 is a functional flow diagram of the architecture of a control box of the system for editing and programming behaviors of a robot in one embodiment of the invention.

FIG. 5 is a functional flow diagram 500 of the architecture of a box of the system for editing and programming behaviors of a robot in one embodiment of the invention.

The flow diagram of the figure summarizes various possibilities offered by the boxes: scripts 5.1, flow diagrams 5.2, timeline 5.3 with, on the one hand, a behavior main frame and, on the other hand, another flow diagram consisting of behaviors.

Figure 6:
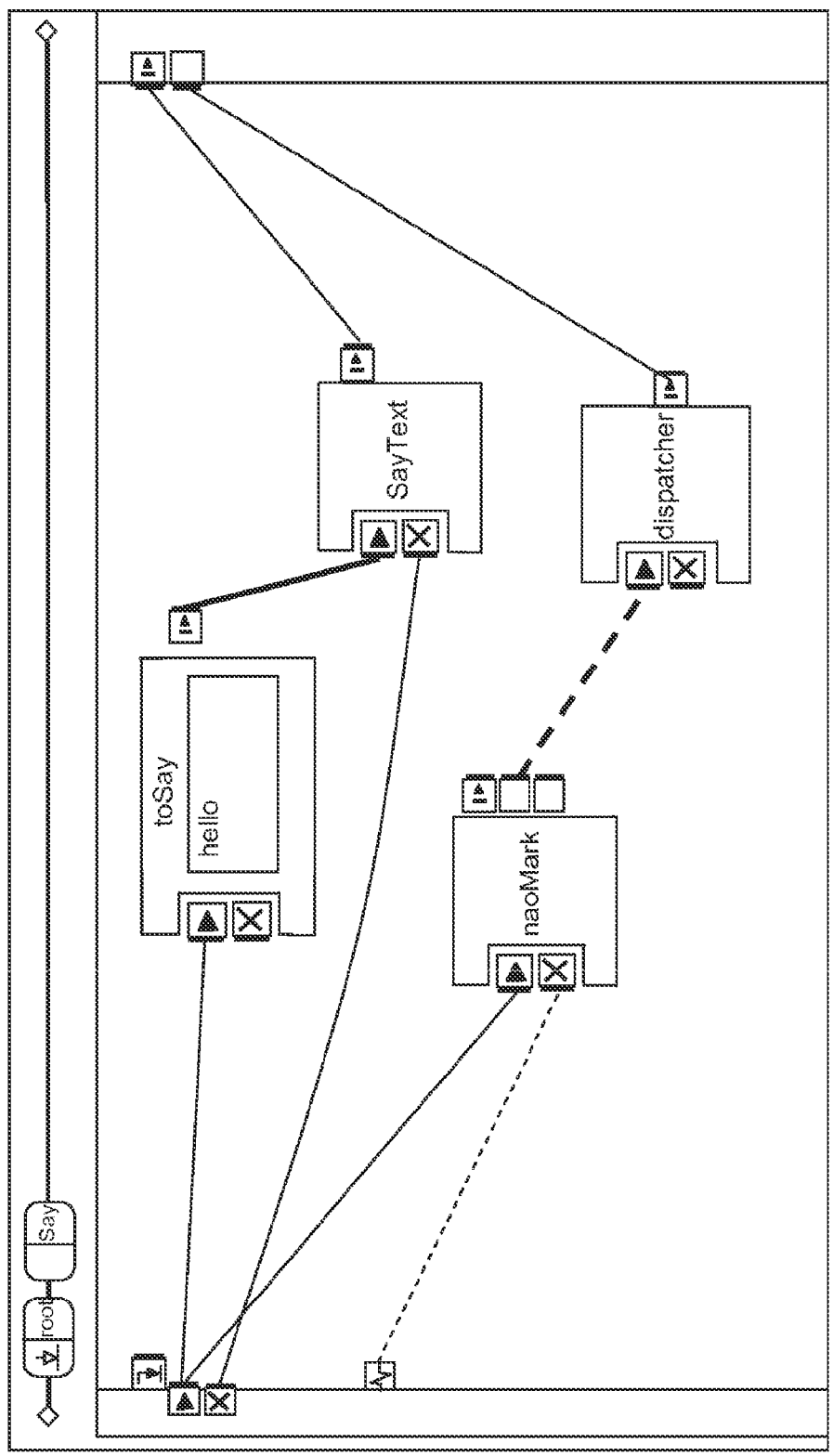
FIG. 6 is a view showing different types of connections between behavior control boxes connected for editing and programming a behavior main frame to be executed by a robot in one embodiment of the invention.

FIG. 6 is a view 600 showing different types of links between behavior boxes connected to edit and program a behavior main frame to be executed by a robot in one embodiment of the invention.

There are a number of possible inputs:
  OnStart: start input which launches the execution of a box;
  OnStop: input, represented by a cross, which stops the execution of the box when it is activated; the stoppage occurs however only at the end of an action for which the interruption during execution would place the robot in an unstable position (case of a "Walk" box, for example);
  OnStopped: output which is activated when the execution of the box is finished; this output can be connected to the inputs of other boxes; these inputs will be activated when the behaviors of the preceding boxes which are connected to this input have been completely executed;
  OnLoad: input concealed in the structure of a box; this input appears when a multiple level box is opened; it is activated when a multiple-level box is completely loaded into memory, said loading occurring only on activation of the higher level box;

Input connected to ALMemory: this input is activated each time the value calculated in ALMemory changes;
the memory ALMemory is a database internal to the robot; it is a short-term memory: the last value of a given variable is inserted therein (with the possibility of having a short history, i.e. a few preceding values of the variable), and the memory may take care of notifying the modules affected by the change of one or more variables; it contains, for example, the information from all the sensors, updated every 20 ms: angular values of motors, current, temperatures, etc.; during execution on a robot, this memory may contain more than 4000 variables; all the modules running on the robot or being connected thereto can communicate with ALMemory, to insert values that are to be published, or to register to variables which are of interest to them and react to their changes (example: react to the battery value, so that the robot looks for its charger when the battery level is below a certain threshold);

Event Input: when this input is activated, the behavior during execution in the box is modified;
as an illustrative example, we will take the case of a "Timer" box stimulating one of its outputs at a regular rate: every n seconds: an input of "event input" type awaits a parameter of "Number" type, and changes the pace of the box if it receives a signal on this input; thus, if a signal of value '3' arrives on its input, the output will thus be stimulated only every 3 seconds;

Punctual Output: this output can be activated at any moment during the execution of a behavior in the box;
as an illustrative example, we will take the case of a face detection box; this box has a punctual output of a "Number" type; when the box is being executed, it stimulates this output each time the robot identifies, within its visual field, a different number of faces compared to the preceding instant; if there was no one, and if the robot sees a face, it stimulates its output with the information '1'; if a 2nd face arrives, it sends the information '2', and if the two faces disappear a little later, it sends '0'; the event "face(s) identified" is thus recovered, with the number of faces identified.

The boxes and events are interconnected by links, as represented in FIG. 6. A link conveys an event signal between inputs and outputs. There can be a number of types of event signals:
an activation signal, with no other information;
a signal carrying one or more numbers (for example, a number of steps or a distance);
a signal carrying one or more character strings (for example, a text which has to be passed to the robot's speech synthesis module);
a composite signal, which may comprise a number of signals, each being one of the preceding types.

Advantageously, these links are represented graphically in different ways, by colors or lines with different textures.

Some boxes accept only inputs of certain defined types and not inputs of other types.

It is possible to establish connections between two boxes belonging to different behavior main frames but having an intersection on one and the same timeline. For this, the user of the system of the invention can select an instant on a timeline and edit all the behavior main frames active at said instant. Thus, if a first main frame is loaded into the timeline and a second main frame appears with its boxes and its connections, the user can move or modify the boxes and the connections between them and thus dynamically modify the behaviors that will be executed by the robot.

Figure 7:
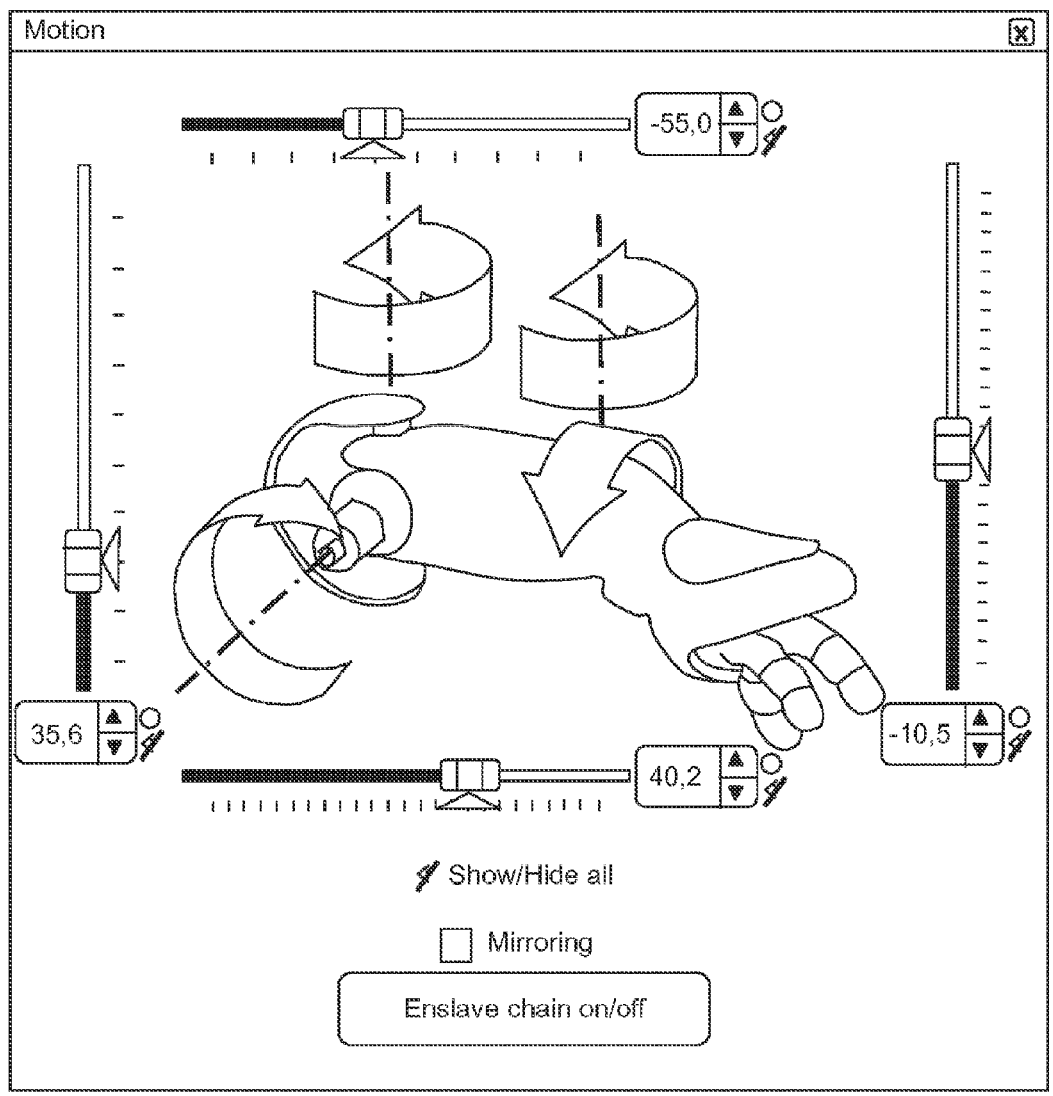
FIG. 7 is a view showing an exemplary programming by direct action on a graphic representation of the motors of a virtual robot in one embodiment of the invention.

FIG. 7 is a view 700 showing an example of programming by direct action on a graphic representation of the motors of a virtual robot in one embodiment of the invention.

FIG. 7 represents the left arm of a robot. In this example, the arm has an arm-shoulder articulation with two orthogonal degrees of freedom actuated by two motors and a hand-arm articulation, also with two degrees of freedom. The angles of rotation of the 4 motors of the articulations can be directly controlled by using the mouse to drag the corresponding cursors to each of the motors. The values of the angles are displayed for each motor. In a standard embodiment of the invention, the performance of the command by the motor of the articulation of the virtual robot may take around one second. In the case where the motion is not performed within this time, this may mean that the motion is not feasible, notably because there is an obstacle which opposes the performance of the motion.

A status indicator shows if the controlled motion was recorded. If the status indicator is in a "not recorded" position, this may mean that the motion is not executable, notably because a motor invoked in a motion layer dependent on a timeline cannot be invoked in another motion layer dependent on the same timeline.

It is possible to view the timelines/angles of each of the motors shown in FIG. 3, individually or for a given part.

As already indicated, it is also possible in this control mode to transfer the motions programmed for a limb to the symmetrical limb. In this case, the motions of the motors are symmetrized.

In this screen, it is possible to program a master-slave mode in which a physical robot connected to the editing and programming system of the invention is controlled by the system and the virtual robot is enslaved to the physical robot.

Figure 8A:
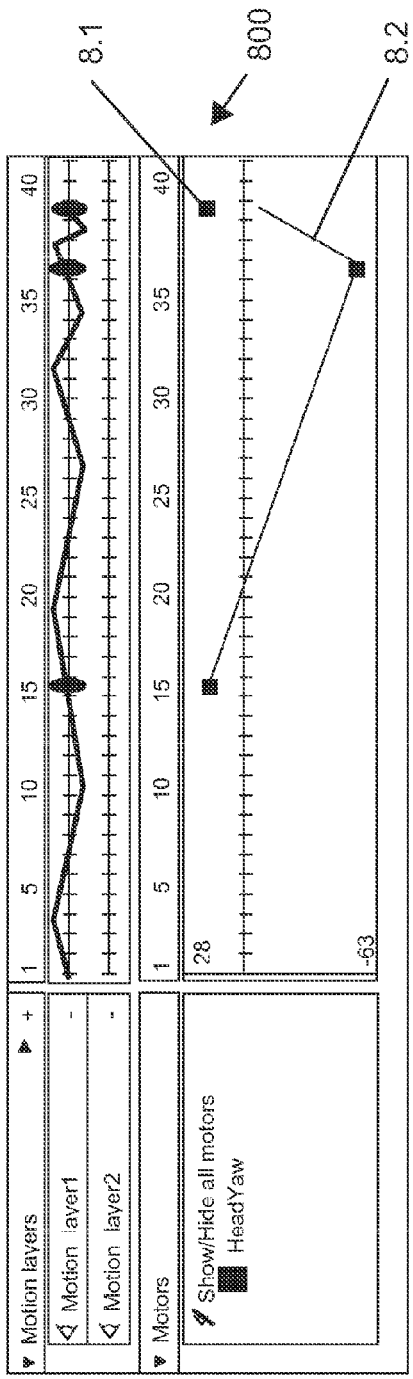
FIGS. 8a and 8b are views of two screens illustrating an example of motion of a robot that is impossible to execute in the time allotted, in one embodiment of the invention.
Figure 8B:
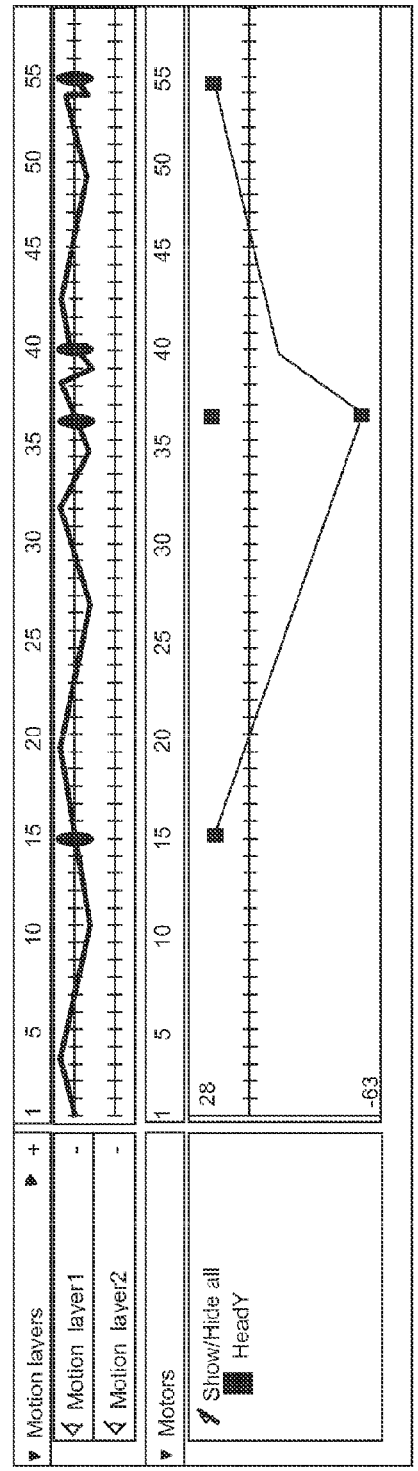

FIGS. 8a and 8b are views of two screens 800, 850 respectively illustrating an example of motion of a robot that is impossible to execute as commanded and an example of adjustment of the motion to make it executable, in one embodiment of the invention.

In FIG. 8a, it can be seen that the line 8.1 which represents the commanded motion does not meet the position of the next motion sequence that it should normally meet (materialized by a small square 8.2). Between the departure position and the arrival position, there are only 5 motion sequence steps. Given the speed limit set to the motor (which may vary for example between 4 and 8 rev/s depending on the motors), the frame scrolling speed (30 FPS in this case), and the angular amplitude to be covered by the motor (from −52 to +37 degrees, in the example of the figure), the command cannot be executed.

In FIG. 8b, it can be seen that the motor has moved onto the execution of the next command as soon as the frame in which the non-executable motion main frame is positioned has been reached.

The conditions of impossibility are, as can be seen, dependent on the number of FPS chosen by the user and the motor limit speeds, it being noted that the latter parameter accepts only small variations and is dependent on the motor characteristics.

Figure 9A:
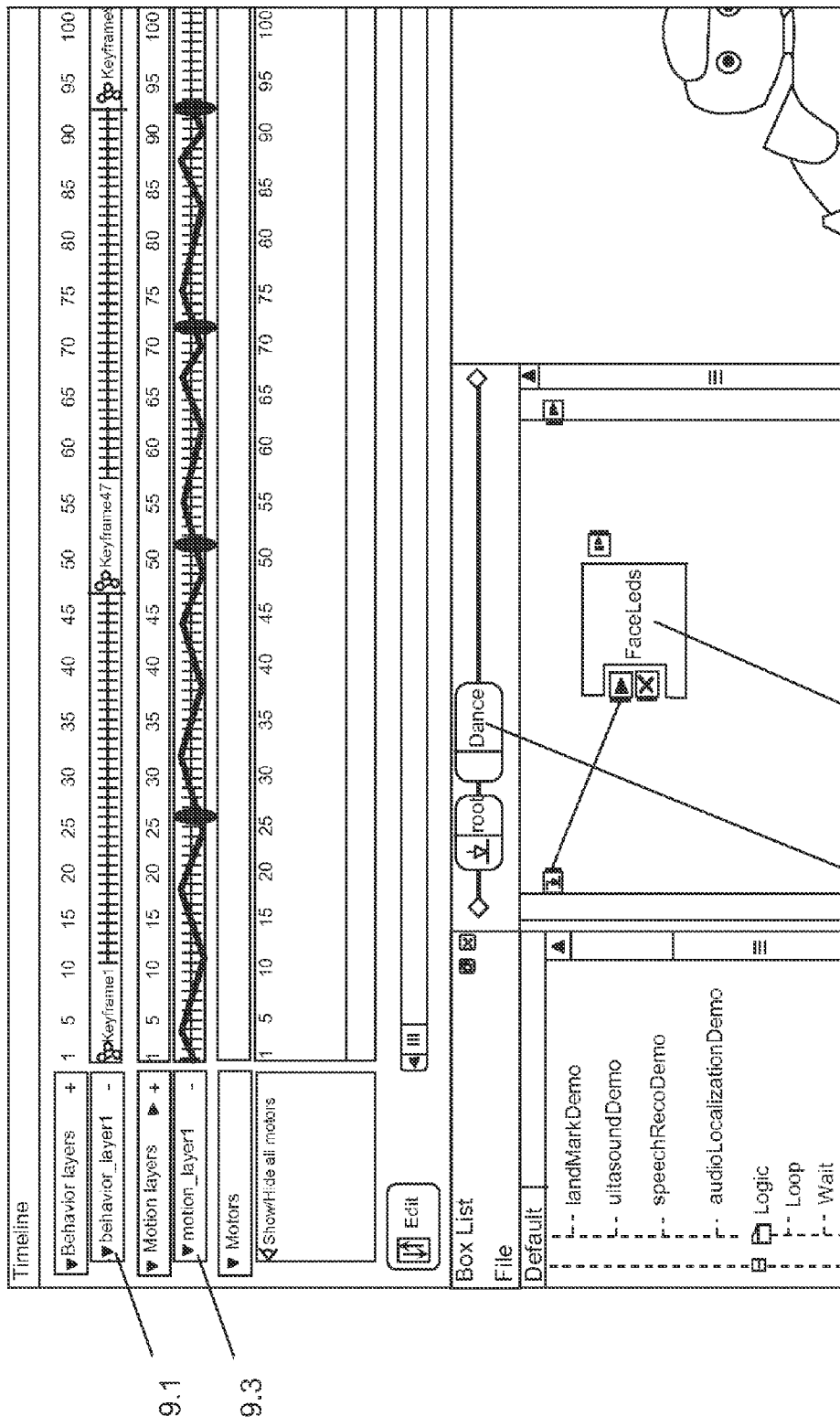
FIGS. 9a, 9b and 9c are views of screens which illustrate a complex example of editing and controlling behaviors of a robot in one embodiment of the invention.
Figure 9B:
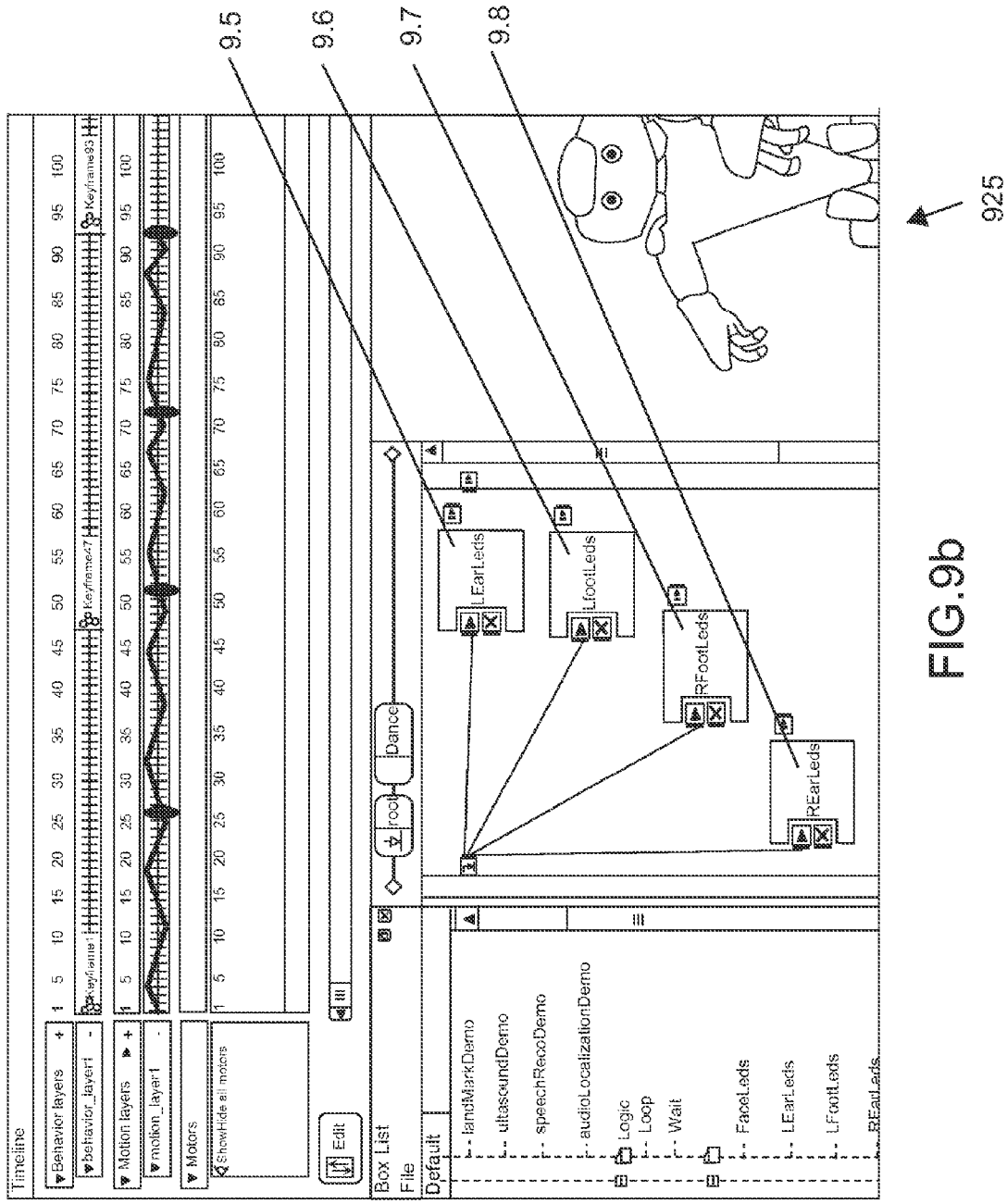
Figure 9C:
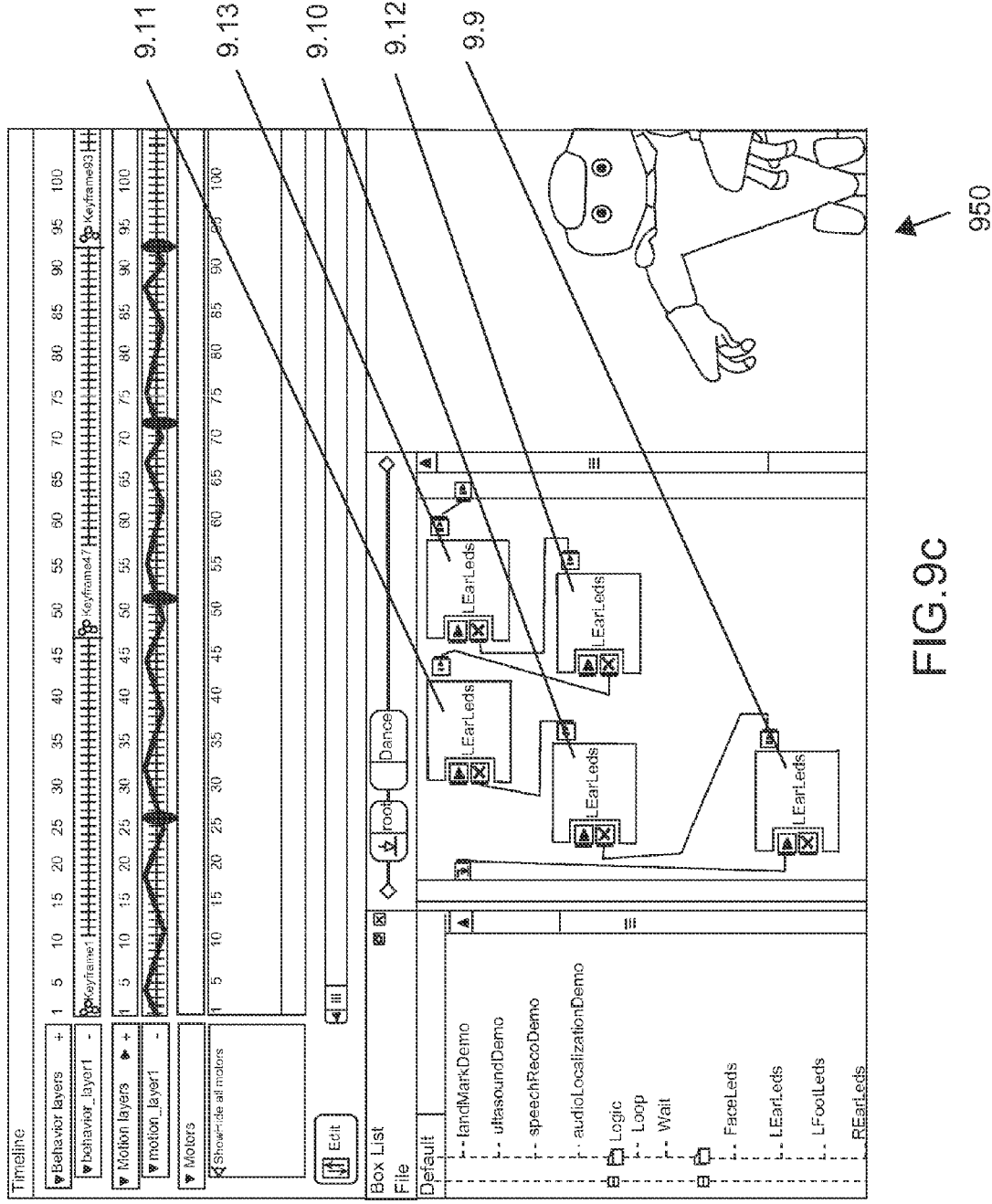

FIGS. 9a, 9b and 9c are views of screens 900, 925, 950 which illustrate a complex example of editing and controlling behaviors of a robot in one embodiment of the invention.

FIG. 9a illustrates a case in which a first behavior sequence (mainframe 1 on behavior_layer1 9.1) is generated by the creation in a layer of behavior type by the addition in the box editing window of a first "Dance" box 9.2, said 1st sequence being synchronized with the timeline in the motion$_{13}$ layer1 9.3. A 2nd "FaceLeds" box 9.4 (LEDs of the face) is added in the box editing window in the 1st sequence mainframe 1.

FIGS. 9b and 9c are two variants of FIG. 9a in which:
in FIG. 9b, other LEDs 9.5, 9.6, 9.7, 9.8 are substituted for the FaceLed 9.4 and are all linked to the input of the box, which means that the corresponding behaviors (switching on of the LEDs) will be executed in parallel;
in FIG. 9c, other LEDs 9.9, 9.10, 9.11, 9.12, 9.13 are added in sequence before the FaceLed 9.4, which means that their switching on is done in succession before the switching on of the FaceLED 9.4.

Figure 10A:
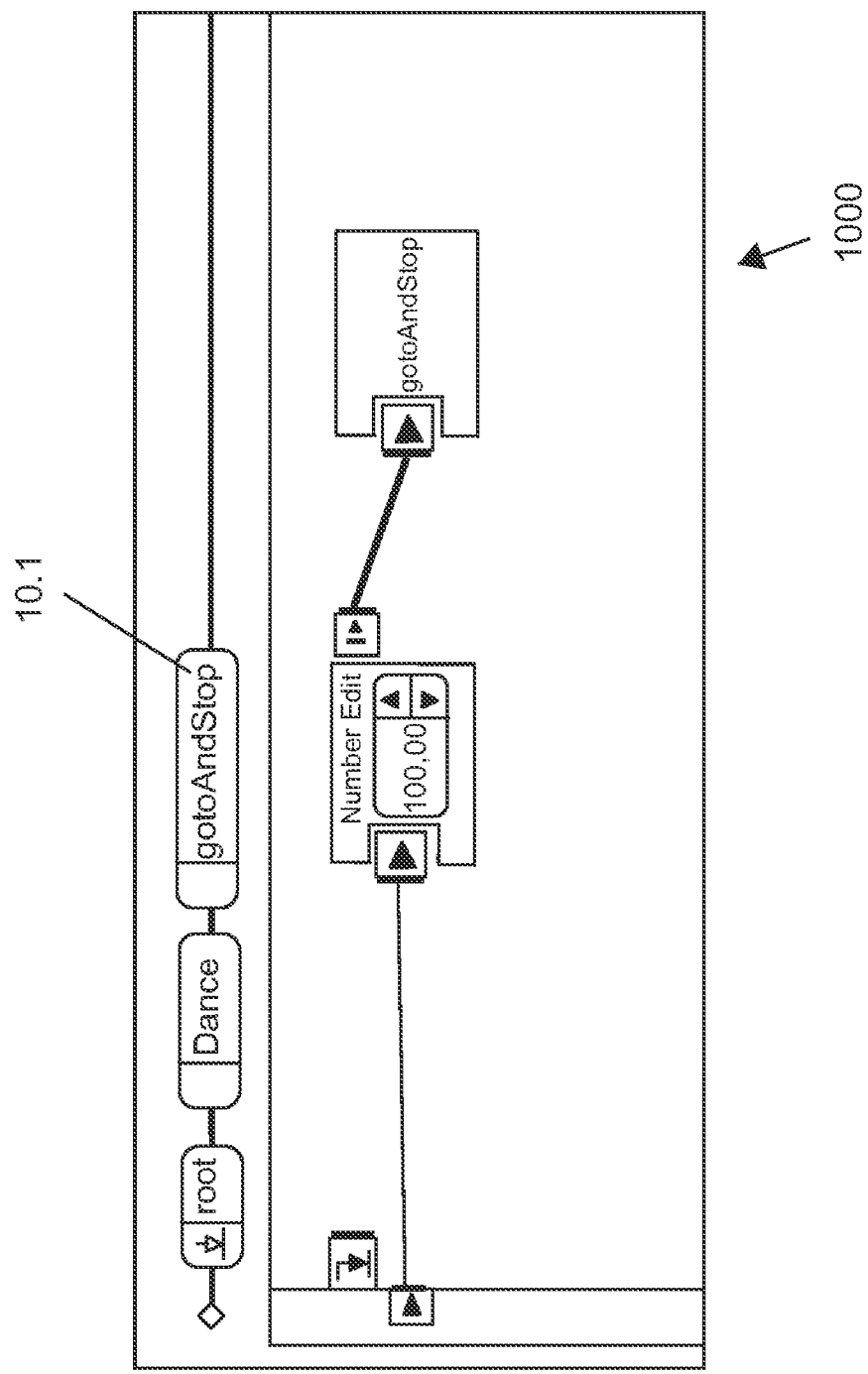
FIGS. 10a, 10b and 10c are views of screens which illustrate an example of editing and controlling a sequence of behaviors of a robot synchronized with a frame time axis or timeline in one embodiment of the invention.
Figure 10B:
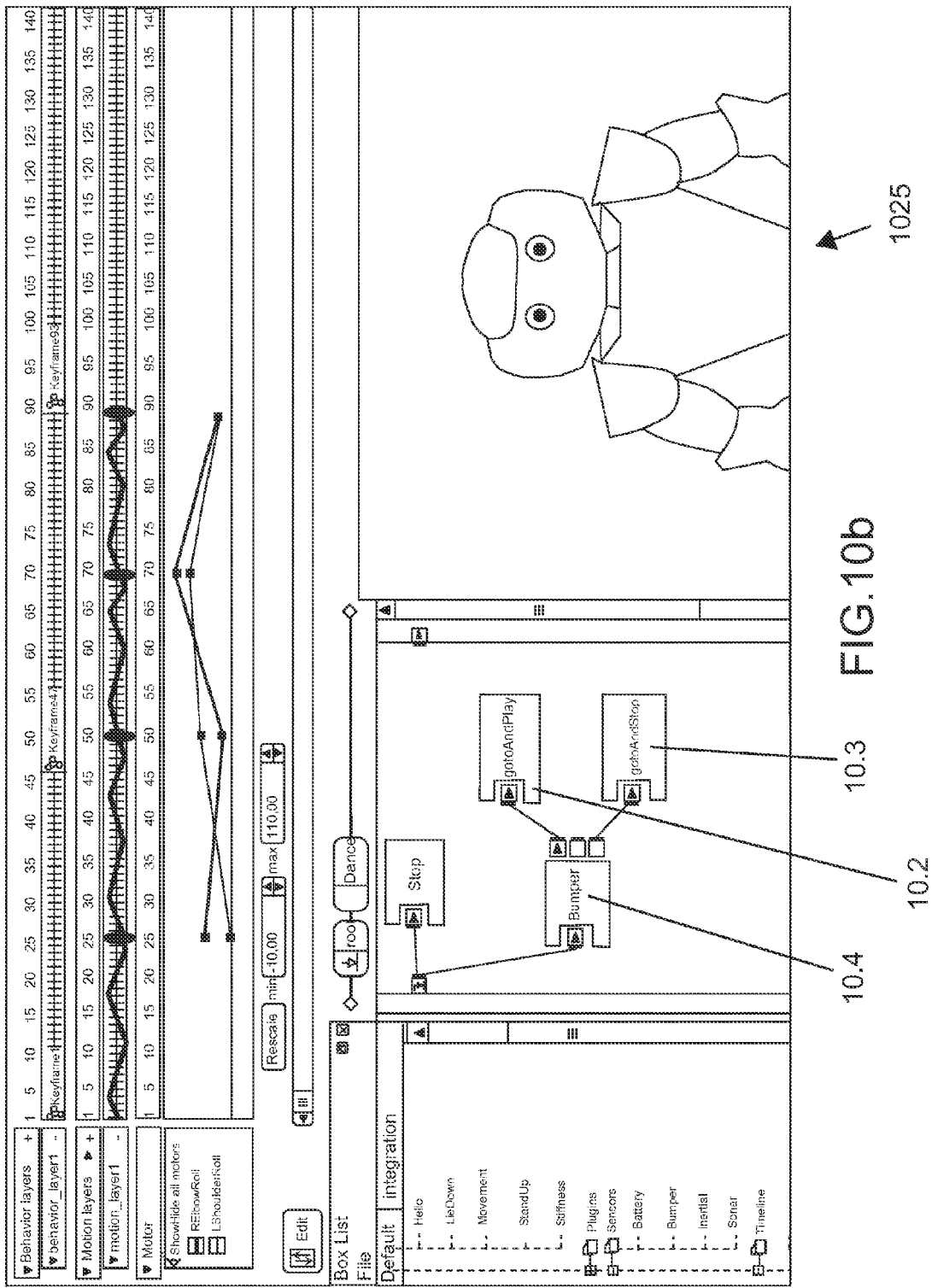
Figure 10C:
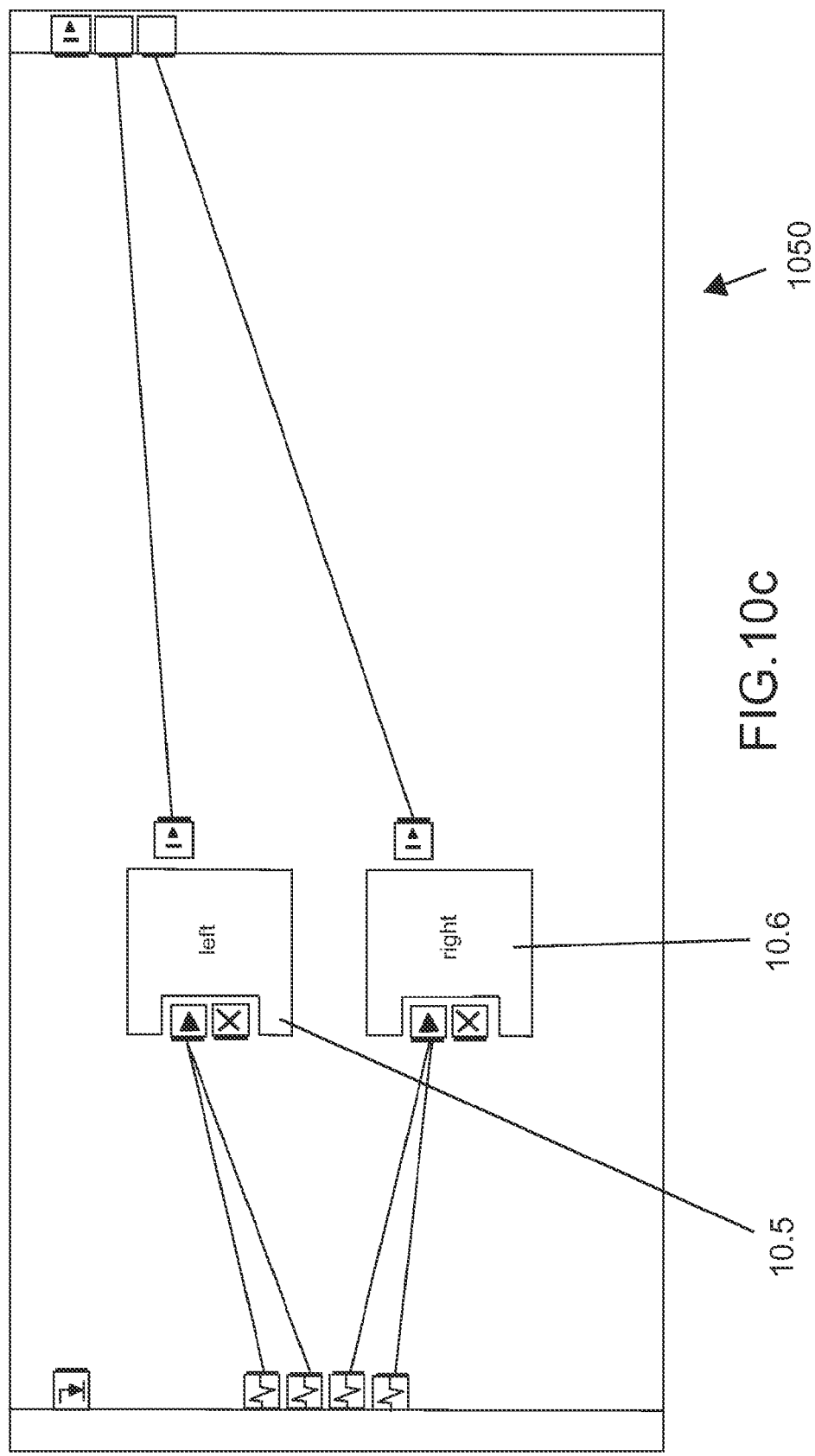

FIGS. 10a, 10b and 10c are views of screens 1000, 1025, 1050 which illustrate an example of editing and controlling a sequence of behaviors of a robot synchronized with the timeline in one embodiment of the invention.

FIG. 10a shows a "GotoAndStop" box 10.1 parameterized by a frame index of the timeline (100 in the example of the figure). When this box 10.1 is activated, the execution jumps to the step designated by the parameter of the box and the execution of the current behavior is stopped.

As indicated in FIG. 10b, there is also a "GotoAndPlay" behavior box 10.2 which is distinguished from the "GotoAndStop" behavior box 10.3 in that, instead of stopping the running of the time in the behavior layer concerned, it can run it from the specified step. In the case illustrated, two boxes, "GotoAndPlay" 10.2 and "GotoAndStop" 10.3, are connected to the outputs of a "Bumper" box 10.4 which comprises the impact sensors respectively of the left foot and of the right foot of the robot (in one embodiment, the robot has two impact sensors on each foot).

FIG. 10c shows an internal view of the Bumpers box in which are illustrated the two "left" (sensors of the left foot) and "right" (sensors of the right foot) sensors 10.5, 10.6.

Back to FIG. 10b, it will be seen that
if at least one of the sensors of the left foot is activated (impact of the left foot on an obstacle detected by the sensor), the current behavior (dance in the example of the figure) is stopped but the timeline of the behavior layer in which the walk behavior is inserted continues to run;
if at least one of the sensors of the right foot is activated (impact of the right foot on an obstacle detected by the sensor), the current behavior (walk in the example of the figure) is stopped and the timeline of the behavior layer in which the walk behavior is inserted is paused.

Figure 11:
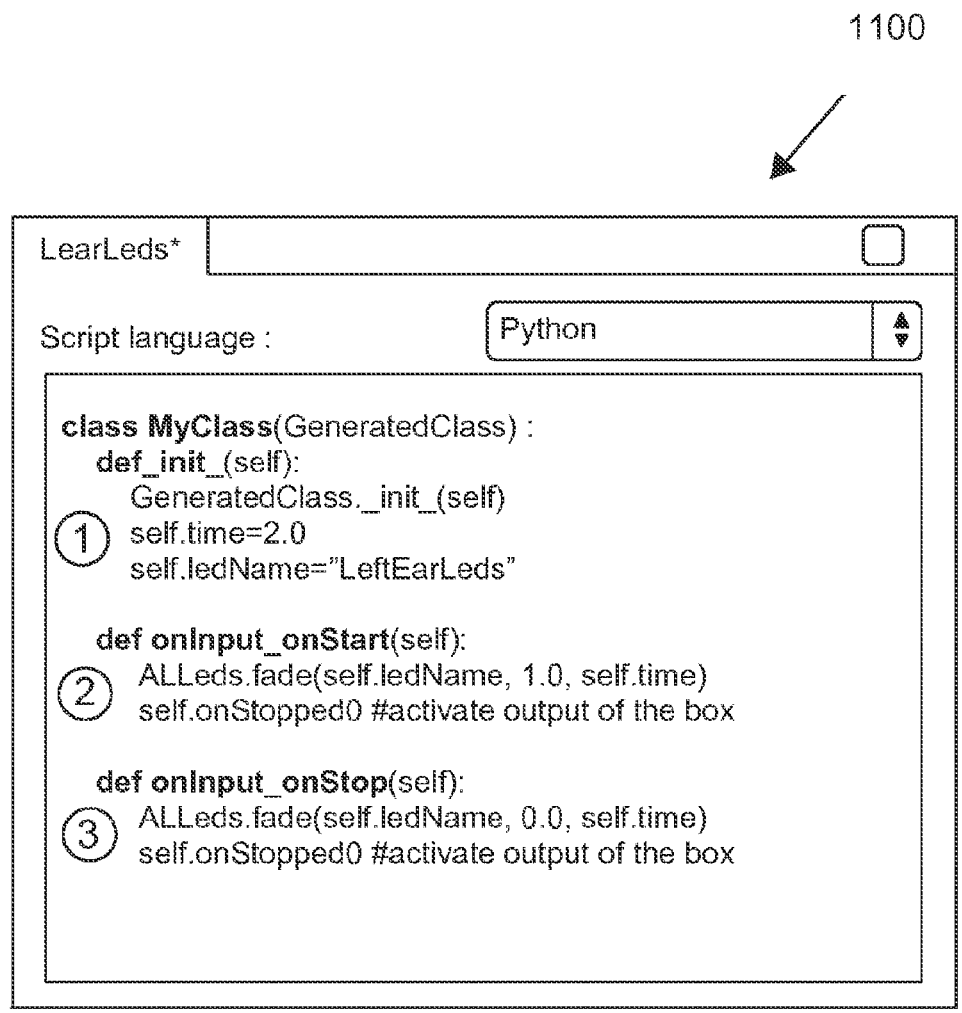
FIG. 11 illustrates an exemplary script allowing for the direct programming of the execution of a behavior of a robot in one embodiment of the invention.

FIG. 11 illustrates an example of a script 1100 allowing for the direct programming of the execution of a behavior of a robot in one embodiment of the invention.

The example of the figure is a script for switching on the LEDs of the left ear of the robot (LEarLeds). A script is a module, written here in Python language, which is an interpreted language. The creation of a script box is done in 3 steps:
instantiation of the box;
registering of the box as a module which can be called by the other boxes which are linked to it;
initialization of the box.

The user does not intervene in the first 2 steps. He or she controls the 3rd. Since it is conventionally in script language, each module is made up of methods which can be used in one or more classes. Attributes (or variables) are defined for one or more modules. The scripts are wholly or partly modifiable by the user. The modules of the system are directly accessible. Some modules manage the basic functions of the robot (ALMemory for its memory, ALMotion for the motion functions, ALLeds for the LEDs, etc.). The ALMotion module offers an interface (in the programming interface sense) for moving the robot. It contains very high level methods, such as "walk 1 m ahead", or lower level methods: "move the 'Head-Pitch' articulation—up to 30 degrees in 1.5 seconds, using an interpolation to smooth the motion". The ALLeds module gives access to all the LEDs of the robot; it is thus possible to adjust the intensity, the color (when the LED can change color) of each LED or of a group of LEDs (all those of the left eye at once for example). There are also higher level methods, making it possible to rotate the LEDs of a group (such as the LEDs of the ears for example).

The system for editing and controlling the motions of a mobile robot of the invention can be installed on a market-standard personal computer having a conventional operating system (Windows, Mac, UNIX). The script language or languages used must be installed on the computer. If the system is used to directly control a physical robot, a link, either WiFi type radio link or wired link, is necessary. These links can also be used to retrieve, over a local or remote network, behavior scripts exchanged with other users. The virtual robot of the editing and control system is the image of the physical robots to be controlled by the system which will have to be able to interpret and execute the commands received from the system.

One and the same editing and control system according to the invention can control a number of robots. Some of these robots may have different physical appearances—humanoid, animal, etc.—and even different structures (different numbers of degrees of freedom; simple robots executing only motions and other robots that can execute motions and behaviors). The robots that are able to be controlled by the system of the invention must, however, have the necessary communication interfaces and software modules suitable for executing the scripts of the boxes of the editing and control system according to the invention.

The examples described above are given as illustrations of embodiments of the invention. They do not in any way limit the scope of the invention which is defined by the following claims.

The invention claimed is:
1. A method, comprising:
receiving, within a robot controller, an edit to at least one action of a mobile robot from a user, said action being a member of a group of actions of a behavior type or a motion type, and being associated with at least one main action frame; and
controlling the at least one action of the mobile robot via the robot controller,
wherein the at least one action of the mobile robot is triggered by at least one control box in which said main action frame is associated with at least one event chosen from a group of preceding events and of succeeding events, and
wherein each of said main action frame, said preceding events, and said succeeding events proceed according to a single time reference of a timeline, and
wherein said at least one control box includes one or more links for receiving at least one event input during a period of time defined by the timeline of said main action frame, the at least one event input including at least one of a modification of a behavior, a new behavior, and an input from a sensor, said at least one control box taking into account said at least one event input if said period of time includes a time at which the at least one input event is received at said control box.

2. The method according to claim 1, wherein said main action frame is associated with at least one behavior or motion layer.

3. The method as claimed in claim 2, wherein said at least one behavior or motion layer is defined within said at least one control box of the robot controller.

4. The method according to claim 1, wherein said main action frame is a first behavior main frame and is broken down into elementary behaviors, each of said elementary behaviors being defined within said at least one control box of the robot controller, said at least one control box being interconnected within at least one flow diagram.

5. The method according to claim 4, further comprising a second behavior main frame, wherein the first behavior main frame and the second behavior main frame are executed in parallel according to a same timeline, and wherein the first behavior main frame and the second behavior main frame are defined within a same box of said at least one control box.

6. The method according to claim 4, wherein said at least one control box comprises at least one second control box.

7. The method according to claim 6, wherein said second control box enables the user to set an operating parameter of a higher level control box.

8. The method according to claim 4, wherein said at least one of the control boxes comprises a script that can be directly interpreted by the robot, said script being directly modifiable by the user.

9. The method according to claim 3, wherein said at least one control box comprises at least one input and at least one output.

10. The method according to claim 9, wherein at least one output of at least one first control box is connected to at least one input of at least one second control box by a connector conveying an event signal.

11. The method according to claim 1, wherein the mobile robot comprises a head and up to four limbs.

12. The method according to claim 11, wherein the action is a motion of at least a part of the robot chosen from a group of parts comprising at least the head and up to four limbs and defined by a rotation of at least one motor.

13. The method according to claim 12, wherein the at least one rotation of the at least one motor is defined by an action of the user on a cursor positioned on a motion screen representing the part of the robot to be set into motion.

14. A nontransitory computer-readable medium comprising program code instructions causing a computer to execute the method according to claim 1, when the program code instructions are executed on the computer, said program code instructions being adapted to perform the receiving, within the robot controller, the edit to at least one action of the mobile robot from the user, and the controlling the at least one action of the mobile robot via the robot controller.

15. A system enabling a user to edit and control at least one action of a mobile robot, said system comprising:
a computer comprising a module for displaying a virtual image of said mobile robot;
a communication link suitable for connecting said computer with said mobile robot; and
a nontransitory computer-readable medium having instructions encoded thereon, and when the instructions are executed on the computer, the instructions cause the computer to perform the operations of
receiving, within a robot controller, an edit to at least one action of the mobile robot from a user, said action being a member of a group of actions of a behavior type or a motion type, and to at least one main action frame, and
controlling the at least one action of the mobile robot via the robot controller,
wherein the at least one action of the mobile robot is triggered by at least one control box in which said main action frame is associated with at least one event chosen from a group of preceding events and of succeeding events, and
wherein each of said main action frame, said preceding events, and said succeeding events proceeds according to a single time reference of a timeline, and
wherein said at least one control box includes one or more links for receiving at least one event input during a period of time defined by the timeline of said main action frame, the at least one event input including at least one of a modification of a behavior, a new behavior, and an input from a sensor, said at least one control box taking into account said at least one event input if said period of time includes a time at which the at least one input event is received at said control box.

16. The system of claim 15, wherein the mobile robot includes a computer program and a memory configured to interpret commands received from the system.

17. The method according to claim 1, wherein the at least one event input stops execution of said at least one control box when said at least one control box is activated and only at an end of an action for which the interruption during execution would place the robot in an unstable position.

18. The method according to claim 10, wherein the event signal includes one or more of an activation signal, a signal carrying one or more numbers, and a signal for carrying one or more character strings.

19. The system of claim 15, wherein the at least one event input stops execution of said at least one control box when said at least one control box is activated.

* * * * *